United States Patent [19]

Simoncic et al.

[11] Patent Number: 4,825,400
[45] Date of Patent: Apr. 25, 1989

[54] FLOATING POINT ACCUMULATOR CIRCUIT

[75] Inventors: Paul A. Simoncic, Daytona Beach; Walter R. Steiner, Ormond Beach, both of Fla.

[73] Assignee: General Electric Company, Durham, N.C.

[21] Appl. No.: 818,284

[22] Filed: Jan. 13, 1986

[51] Int. Cl.⁴ ............................................... G06F 7/50
[52] U.S. Cl. .................................................... 364/748
[58] Field of Search ........................................ 364/748

[56] References Cited

U.S. PATENT DOCUMENTS

| | | | |
|---|---|---|---|
| 3,551,665 | 12/1970 | Powers et al. | 364/748 |
| 4,054,787 | 10/1977 | Pos | 364/748 |
| 4,414,640 | 11/1983 | Yabuuchi et al. | 364/702 |
| 4,592,006 | 5/1986 | Hagiwara et al. | 364/748 |
| 4,644,490 | 2/1987 | Kobayashi et al. | 364/748 |

*Primary Examiner*—David H. Malzahn
*Attorney, Agent, or Firm*—Spensley Horn Jubas & Lubitz

[57] ABSTRACT

A high-speed, 3-stage, pipelined architecture floating point accumulator circuit having a pre-normalization feedback loop for accumulated numbers to increase processing speed.

10 Claims, 3 Drawing Sheets

FLOATING POINT ACCUMULATOR CIRCUIT

BACKGROUND OF THE INVENTION

1. FIELD OF THE INVENTION

This invention relates to electronic accumulator circuits, and more particularly to a floating point accumulator integrated circuit.

2. BACKGROUND INFORMATION

In the prior art, electronic accumulators have typically been designed as circuit board level products, typically having a general architecture similar to that shown in FIG. 1. In such systems, floating point numbers were accumulated by comparing the exponents of two floating point numbers, aligning the binary point for both numbers, adding the two numbers, normalizing the result to a floating point number, and outputing the result, which is also fed back to the input for addition to the next number input to the circuit.

For an extremely high-speed computer system, it would be desirable to be able to accumulate floating point numbers in no more than one clock cycle of the system master clock. In the above-outlined prior art, it is either extremely expensive or virtually impossible to design an accumulator circuit that has such characteristics.

With advances in technology, circuitry from a circuit board level product can now be shrunken down onto a single integrated circuit chip. Reducing the size of the circuitry will inherently result in a faster processing speed. However, in some circumstances, such as in special purpose high speed graphics processing computers, ever higher speeds are desirable. Therefore, this invention presents a novel circuit design that obtains very high speed operation by using a pipelined architecture and feeding back the output of the addition circuit to the input of the accumulator circuit before normalization occurs. This results in a loss of some accuracy, but significantly speeds up the accumulation process, thus permitting a faster clock frequency and one clock cycle accumulation. In many instances, the loss of accuracy is negligible or tolerable, and the benefits of higher speed operation outweigh such loss.

Therefore, it is an object of the present invention to present a high speed, single clock cycle, pipelined floating point accumulator having a non-normalized feedback loop.

DESCRIPTION OF THE DRAWINGS

Like reference numbers in the various drawings refer to like elements.

SUMMARY OF THE INVENTION

Figure 1:
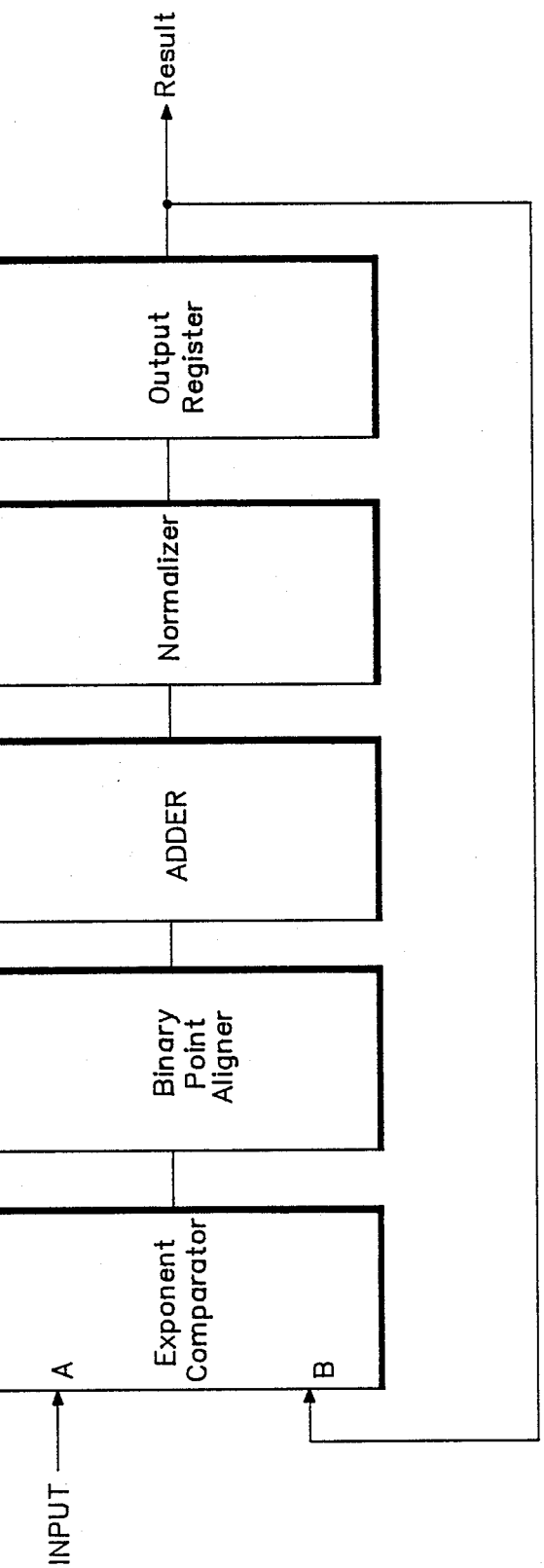
FIG. 1 is a block diagram of a prior art accumulator architecture.

The present invention may be generally described as a floating point accumulator integrated circuit having a pipelined architecture, with a pipeline latency of 400 nanoseconds and a throughput of 100 nanoseconds for a 10 MHz clock (using 32-bit floating point numbers in the preferred embodiment). Generally speaking, the pipelined architecture of the present invention can be described as five interdependent sections. These are the input section; the exponent comparison and twos' complementing section; the accumulation section; the normalization section; and the output section.

The input section is made up of a latch, a multiplexer, and an input register. The latch is used only when data enters the chip in a time multiplexed fashion. Data and control signals are stored in the input register for use in the next section. The exponent comparison and twos' complementing section is used to determine which mantissa—that of the input floating point number, or that of the accumulated number—will have to be shifted in order to align the binary points so that addition in the accumulation section may proceed. The twos' complement part of this same section converts the mantissa from a signed magnitude number to a twos' complement number to simplify addition in the accumulation section. A register at the end of this section stores the twos' complement mantissa, a shift code, some control signals to indicate which of the mantissas is the smaller (and therefore to be shifted), and the largest exponent (which is also fed back to this section for the next exponent comparison).

The accumulation section receives inputs from the exponent comparison and the twos' complement section, and feedback from an accumulator register. The mantissa corresponding to the smaller exponent (as determined in the previous section) is fed into a right shifter and shifted as determined by the calculated shift code. The shifted mantissa and the unshifted mantissa are then added. With proper accounting for overflow of the two added numbers, the output is stored in an accumulator register. The largest exponent, as determined in the exponent comparison section, is passed unchanged through the accumulation section and is also stored in a register.

The normalization section converts the twos' complement mantissa of the accumulation section back into a signed magnitude format. The largest exponent is increased by one if the accumulator register had an overflow indication. The sign, exponent, and mantissa are combined into a floating point number. If an exponent overflow or underflow occurred, this section detects the condition and sets the output of this section to negative or positive infinity (in the case of an overflow), or to zero (in the case an underflow). The resulting number from this section is stored in an output register.

The output section stores the results of the preceeding normalization section, and drives the output signal lines.

The present invention uses the proposed IEEE standard floating point format, which consists of 23 bits of mantissa, 8 bits of exponent, and a sign bit. In this format, a binary point is understood to exist between bit positions 22 and 23. A floating point number is represented in one of the following ways:

1. If the exponent is nonzero, then:

Number $= [(-1)^{(sign)} \cdot 2^{(exponent-127)} \cdot (1.\text{data})]$

2. If the exponent is zero, but the data is nonzero (indicating a denormalized number), then:

Number $= [(-1)^{(sign)} \cdot 2^{(-127)} \cdot (0.\text{data})]$

3. If both the exponent and the data are zero, then:

Number $= 0.0$

4. If the exponent is $FF_{16}$ and the mantissa is zero, then:

Number is considered to be: (+ or −) infinity.

5. If the number is $FF_{16}$ and the mantissa is nonzero, then:

Number is considered to be: not a number.

In order to simplify the circuitry of the present invention, a denormalized number is forced to zero, and any number with an exponent of $FF_{16}$ is forced to (+ or −) infinity, depending on the sign bit.

The accumulator circuit of the present invention will add "n" positive numbers with no error, provided that the result does not exceed either boundary of the floating point number system. When a negative number is added to the accumulated total, some error results due to the following approximations that were made to enhance the speed of the circuit:

1. Numbers are normalized only before they leave the chip. They are not normalized during the accumulation.

2. There is no round-off circuitry included in the design.

3. Negative numbers are converted back to a signed magnitude format with a ones' complement operation instead of a twos' complement operation.

Internally, the mantissa is carried to 25 bits (23 bits of input data, a hidden bit, and a guard bit when necessary). The exponent is carried to 9 bits of precision until the normalization section, where another bit is added for underflow detection.

DETAILED DESCRIPTION

Figure 2A:
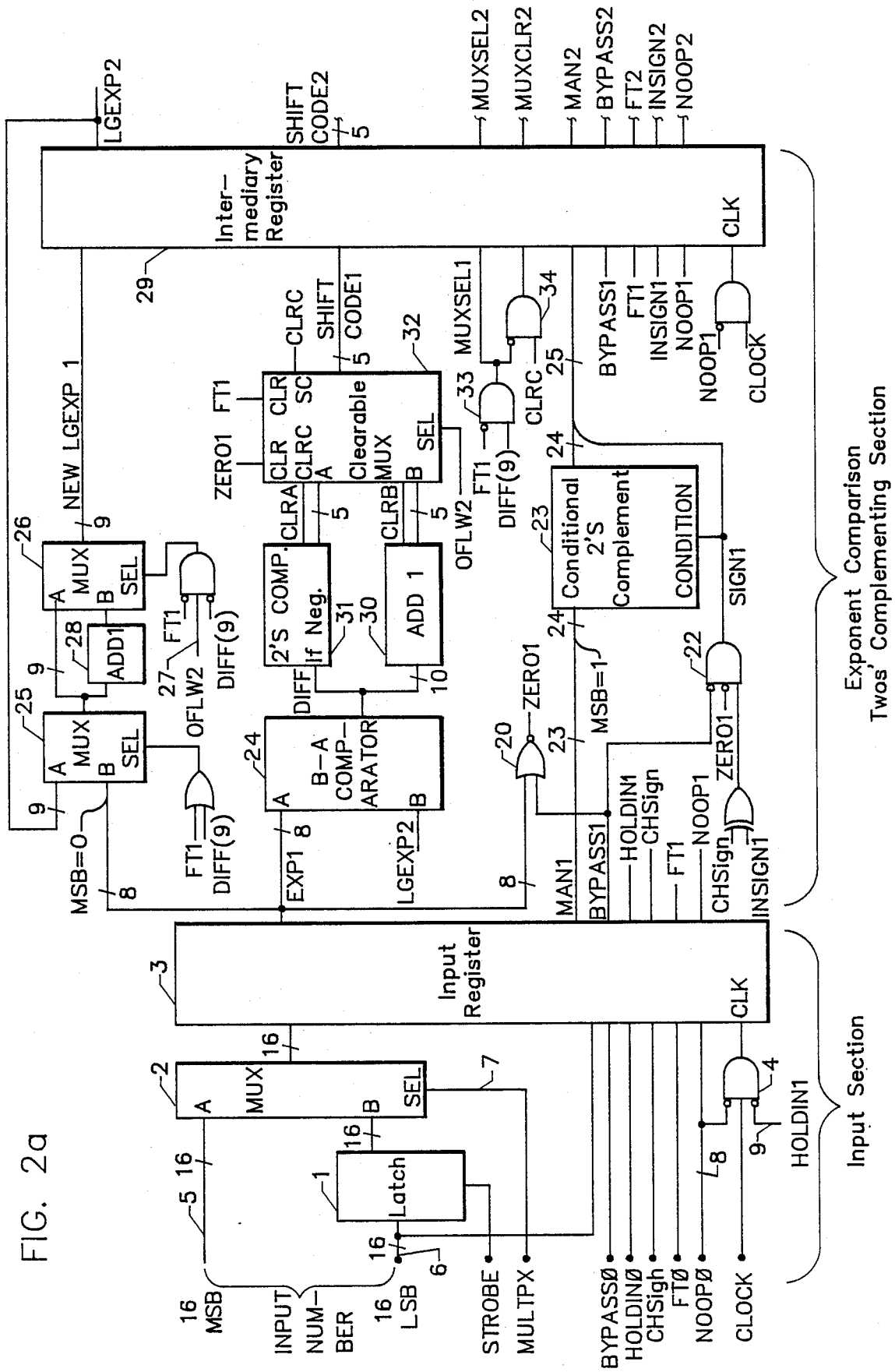
FIGS. 2a and 2b are detailed block diagrams of the inventive accumulator circuit.
Figure 2B:
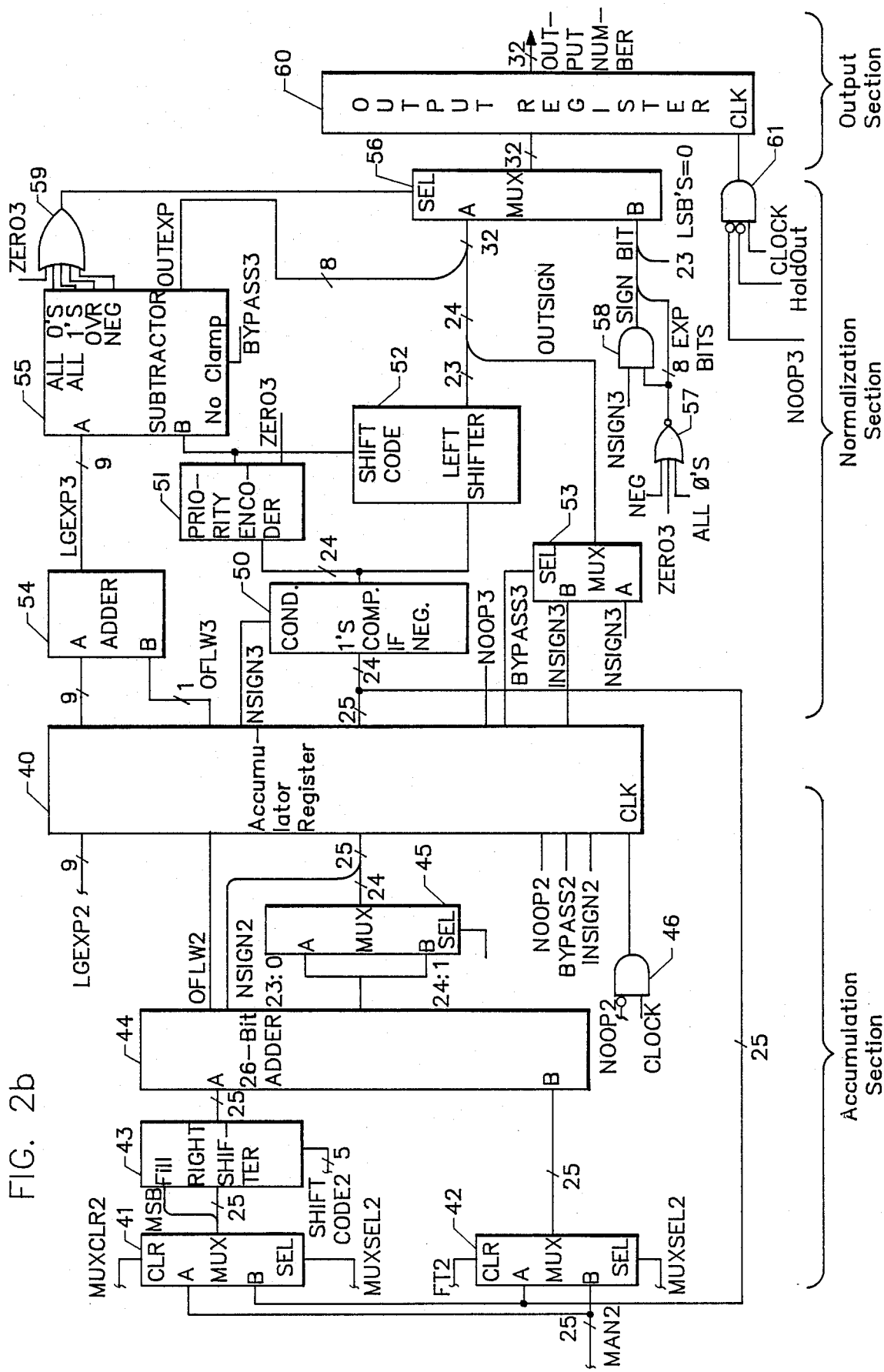

FIGS. 2a and 2b show a detailed block diagram of the inventive circuit. In the preferred embodiment of the inventive circuit, extra circuitry is added for the convenience of the end user. The presence of such circuitry should not be taken as a limitation of the basic invention.

In an integrated circuit version of the present invention, there are 49 inputs and 34 outputs. Of the 49 inputs, 32 inputs are for data. Of these 32 inputs, 16 may be ignored, if desired, and 32 bits of data can be entered in a time multiplexed fashion over the remaining 16 inputs. The other 17 inputs are for control signals, a clock signal, a strobe signal, and a serial input to the output registers for test data. The 34 outputs include the 32-bit data output (i.e., a floating point number), a serial output from the scan registers for testing purposes, and one control signal.

Among the control signals to the input portion of the circuitry are the following:

First Term flag (FT$\phi$) — signifys the first term of an accumulation. A logical "1" initializes the accumulator circuit.

Bypass$\phi$— when used with the First Term Flag, data inputs to the circuit will pass through the circuit without being altered, appearing on the outputs of the circuit three clock cycles after being clocked in.

ChangeSign (CHSing) — used to substract the input number from the accumulated number; causes the circuit to change the sign of the input mantissa.

No Operation (NOOP$\phi$) — signifys that the data input to the circuit is invalid, and not to be accumulated.

HoldIn — causes the input data to be held in the input register as the data for the next operation.

HoldOut — holds the output data in the output register. The circuit continues to accumulate data, but the output signals from the circuit do not change.

Multiplexing Select (MULTPX) — used to choose the time multiplexed input mode.

The input section of the accumulator circuit comprises a latch 1, a multiplexer 2, an input register 3, and an input AND gate 4. Input signals lines to the input section comprise the 16 most significant bits of the input data (i.e., a floating point number) over a first set of data lines 5, and the 16 least significant bits over a second set of data lines 6. A multiplex control line (MULTPX) 7 is used to determine whether the data inputs are accepted in a 16-bit time multiplexd fashion, or as 32 input signals during a single clock cycle. If the multiplex signal line 7 is active, the 16 least significant data bits are latched into the latch 1 on the falling edge of a strobe signal. This simplifies usage, since the clock and strobe signals may be tied to the same signal externally in a normal multiplex configuration. Once the 16 least significant bits are latched into the latch 1, the 16 most significant data bits enter directly into the input register 3 over the second set of signal lines 6, while the output of the latch 1 is simultaneously entered into the input register 3 through the multiplexer 2. In a nonmultiplexed system, the 16 most significant bits are entered into the input register 3 through the multiplexer 2 over the first set of signal lines 5, simultaneously with the input of the 16 least significant bits to the input register 3 over the second set of signal lines 6. In this later case, the latch 1 is not used.

The purpose of the latch 1 and the multiplexer 2 are simply to store in the input register 3 all 32 data bits comprising the floating point number to be accumulated.

The input AND gate 4 before the clock input of the input register 3 governs the clocking of that register. The logic states of a No Operation signal (NOOP$\phi$) line 8 and a HoldIn1 signal line 9 control the transmittal of the clock signal to the input register 3. The HoldIn1 signal is identical to the HoldIn$\phi$ signal, but delayed one pipeline stage.

The remaining control inputs to the circuit are latched into the input register 3 for later use in the circuit if the No Operations signal line 8 and HoldIn1 signal line 9 are activated to allow transmittal of the clock signal through the input AND gate 4.

The second section of the circuit comprises the exponent comparison and twos' complement circuitry. The inputs to this section include the data and control signals from the input register 3. Unless the current input number from the input register 3 is the first term of an accumulation, an additional input to this section is a largest exponent term (LGEXP2) and an overflow signal (OFLW2), which are fed back from the next section, the accumulation section. The outputs of the second section are the new largest exponent, a calculated shift code, clearable multiplexer control signals, and a twos' complement mantissa. The accumulation section uses the shift code to line up the binary points of the addends of the new mantissa and of the accumulated data (unless, of course, the current input number is the first term of an accumulation).

Exponent comparison refers to the difference between the largest exponent in a calculation and the exponent of the current input floating point number from the input register 3. In essence, the circuit needs to keep track of the largest exponent encountered since the first input number in a series of accumulations.

The input floating point number is treated slightly differently if the First Term flag control signal FTφ is active. If the input floating point number is the first term of an accumulation series, it is considered automatically to have the largest exponent, and the exponent passes through the exponent comparison circuit to the next section without change. In this case, the shift code is set to zero, and the control signals used in the accumulation signal are set to clear the previously accumulated value.

Whether the input number is the first term of an accumulation series or not, this section first calculates to see whether the input number is equivalent to zero, by means of a test NOR gate 20. Since the accumulator circuit forces denormalized numbers to zero, the zero test calculation needs only to examine the eight exponent bits of the input number. If the exponent bits are all zero, a ZERO1 signal is activated to signify that the input is zero, provided that the Bypass signal is not active. The purpose of the ZERO1 signal is to set all the bits (sign, exponent, and mantissa) of the input number to zero.

The ZERO1 signal is used along with the Bypass signal to govern the calculation of the sign for the output exponent. If the entire circuit is to be bypassed, the sign of the input number cannot be changed under any circumstances. The output (SIGN1) of a sign AND gate 22 indicates the sign of the exponent unless forced to zero by the ZERO1 signal, or if the circuit is to be bypassed, as indicated by the Bypass signal. The Change Sign signal (CHSign) also governs whether the SIGN1 signal will be set to indicate a negative number or a positive number.

Since the mantissa of an input floating point number is in a signed magnitude representation, and the adder of the accumulation section works on numbers represented in twos' complement form, the SIGN1 signal also determines whether or not the mantissa should be negated and incremented by one (that is, transformed into twos' complement format) by a twos' complement circuit element 23. If the input mantissa is negative, then the mantissa must be converted to twos' complement form by the complementer circuit element 23.

The mantissa of the input number, temporarily stored in the input register 3, has merged with it a logical "1" in the most significant bit position, replacing the implied "1" inherent in the proposed IEEE 32-bit floating point number standard, before entering the twos' complement circuit element 23.

The comparison of the input exponent with the largest previous exponent takes place in a comparator 24. The output of the comparator 24 is the difference between the largest previous exponent and the exponent of the current input number. If the output of the comparator 24 is negative (as determined by the sign bit of the difference, DIFF(9)), or if the input number is the first term of an accumulation series, a first 9-bit multiplexer 25 and a second 9-bit multiplexer 26 will immediately be set to pass the exponent of the input number as the largest exponent. In these two cases, the exponent of the input number is always the largest exponent of a sum.

If the input number is not the first term, and the output of the exponent comparator 24 is non-negative, the prior largest exponent (LGEXP2) is chosen as the output of the first multiplexer 25. The output of the second multiplexer 26 is selected from two potential inputs based upon the value of an overflow signal (OFLW2) 27. If the overflow signal is active (indicating that the sum of the mantissa in the prior clock cycle caused an overflow signal), the largest exponent must be increased by one. This is done by an adder circuit 28. In this case, the output of the second multiplexer 26 is selected from the adder circuit 28; otherwise, the straight output of the first multiplexer 25 is selected. The output of the second multiplexer 26 consists of the new "largest exponent"(LGEXP1), which is stored in an intermediary register 29.

In parallel with the determination of the next largest exponent, a shift code used in the accumulation section to align the binary points of the two addends is calculated. The output of the exponent comparator 24 represents how far to the right the binary point of the mantissa of the input number is located (in terms of bit positions) from the binary point of the number stored in the accumulator register in the next section. This difference indicates how many times the mantissa of the smaller number should be shifted to align its binary point with the binary point of the larger number. In the present embodiment, only a right shifter circuit is used, thus simplifying the overall circuit. Because only a right shifter is used, if the output of the exponent comparator 24 is negative, rather than shifting the mantissa of the input number, the mantissa of the accumulated number will instead be shifted so that its binary point will be aligned with the binary point of the input number.

The shift code is based upon the magnitude of the difference between the exponents compared in the exponent comparator 24. In the preferred embodiment, for faster operation, the output of the exponent comparator 24 is routed to two separate circuits so that parallel computation may take place. The first circuit is basically an adder 30 that adds one to the output of the exponent comparator 24. If the difference between the exponents input to the comparator 24 is positive, the output of the adder 30 is simply the difference plus one. If the difference is negative, adding "one" essentially causes the ones' complement of the difference to be output from the adder 30.

An output of the adder circuit 30 is a CLRB signal, which is activated if the output of the adder circuit 30 is larger than twenty-four. The significance of the number twenty-four is that if the difference between the two compared exponents is greater than twenty-four, then shifting the smaller mantissa (which comprises 24 bits in the preferred embodiment) to align its binary point with the binary point of the larger number would completely shift the smaller number out of the barrel shifter, and thus the smaller number is approximately equal to zero. This approximation is acceptable, since it means the larger number is twenty-four binary orders of magnitude greater than the smaller number. Therefore, the circuit clears the smaller number to zero by activating the CLRB signal.

The output of the exponent comparator 24 is also routed to a conditional complementer circuit 31, which passes through the difference unchanged if the difference is positive, but outputs the twos' complement of the difference if it is negative. Similar to the adder circuit 30, the conditional complementer circuit 31 has a CLRA signal that is activated if its output is larger than twenty-four.

The outputs of both the adder circuit 30 and the conditional complementer circuit 31 are routed to a 6-bit clearable multiplexer circuit 32. The input selected to be output from the multiplexer 32 is chosen based upon the overflow signal OFLW2. If no overflow occurs, the output of the conditional complementer circuit 31 is selected by the clearable multiplexer 32. In this case, if the exponent difference is positive, the difference becomes the shift code. If the exponent difference is negative, the shift code is the twos' complement of the difference. (Since only a right shifter is used, negative differences are complemented to transform them into positive numbers).

If an overflow of the added mantissas occurs in the prior clock cycle occurs, the output of the adder circuit 30 is selected by the clearable multiplexer 32. In this case, if the exponent difference is positive, "one" is added to the exponent to give a shift code that causes the right shifter to account for one more bit position in the mantissa sum (the overflow bit position). If the difference is negative, the shift code is the ones' complement of the difference.

The output shift code of the clearable multiplexer 32 is stored in the intermediary register 29 for the next section. The shift code output of the clearable multiplexer 32 can be cleared to zero if the First Term signal FT1 are active.

The CLRA or the CLRB signal is also selected by the clearable multiplexer circuit 32 simultaneously with the selection of the 5-bit inputs from the adder circuit 30 and the conditional complementer circuit 31, and forms an output signal now designated as "CLRC". The CLRC output of the clearable multiplexer 32 is set to zero if the ZERO1 signal is active. The CLRC signal is combined with the difference sign signal (DIFF(9)) and the First Term flag signal (FT1) through two AND gates 33, 34 to form a MUXCLR1 signal. The MUXCLR1 signal is used to clear the multiplexer in the accumulation section that selects the mantissa which comes from the smaller exponent (and the mantissas associated with first term input data), and passes those signals on the shifter circuit.

The MUXCLR1 signal is activated only if the CLRC signal is active and either the exponent difference is positive, or the number input into the input register 3 is the first term of an accumulation series. In the first case, if the exponent difference is positive and the CLRC signal is active, it means that the previous largest exponent is enough larger than the exponent of the input number that the shifter would completely shift the new number away, so the new number is cleared to zero. In the second case, when the First Term flag signal FT1 is active and the CLRC signal is active, the term in the accumulation register 40 is considered to be zero and must be cleared. A signal formed from the combination of the difference sign signal (DIFF(9)) of the exponent comparator 24 and the First Term flag signal FT1 (formed by AND gate 33) is used to control a multiplexer in the accumulation section. This signal, the MUXSEL1 signal, always is deactivated if the First Term signal FT1 is activated, otherwise it is the same as the sign bit of the exponent difference. This insures that in the accumulation section, the input number of a first term number, or the number with the smaller exponent in all other cases, always goes to the barrel shifter.

Other signals that are stored in the intermediary register 29 are the Bypass signal, the First Term signal FT1, the input sign signal INSIGN1, and the No Operation signal NOOP1.

The next section of the circuit is the accumulation section. The inputs to this section are those signals which were stored in the intermediary register 29 from the exponent comparison and twos' complement section. In addition, an input to this section is the accumulated sum of prior input numbers that are fed back from an accumulator register 40. The outputs of this section are the denormalized accumulated mantissa, the new sign of the accumulated number (NSIGN2), the accumulated largest exponent (LGEXP2), and an overflow signal (OFLW2). Also stored in the accumulator register 40 are the Bypass signal and the input sign signal (INSIGN2).

A first 25-bit multiplexer 41 and a second 25-bit multiplexer 42 are used to select which path the two addends (the mantissa from the prior section and the accumulated mantissa from the accumulator register 40) will take. The MUXSEL2 signal from the prior secton is used as the select signal for both multiplexers 41, 42. If the MUXSEL2 signal is not active, then the mantissa from the new number passes through the first multiplexer 41 and the mantissa of the accumulated number passes through the second multiplexer 42. This is always the case anytime there is an active First Term signal FT2 or if the exponent of the new number was smaller than the largest accumulated exponent. In all other cases, the data flow through the two multiplexers 41, 42 is reversed.

If the First Term signal FT2 is activated, all accumulated data in the second multiplexer 42 is cleared, resulting in an output from that multiplexer of all zeros. This will result in the new input number being added to zero. Similarly, the output of the first multiplexer 41 will be cleared if the MUXCLR2 signal is active, causing the accumulated data to be added to zero.

The output of the first multiplexer 41 is coupled to a 25-bit right shifter circuit 43. The shift code from the prior section controls the number of times the input number to the right shifter 43 is shifted. As the input number is shifted to the right, the value of the most significant bit (the sign bit) is used to fill in the upper bit positions of the shifted number to preserve its twos' complement data representation. The output of both the shifter 43 and the second multiplexer 42 are coupled as inputs to a 26-bit adder circuit 44. Internally in the adder, the two input numbers are extended from twenty-five bits to twenty-six bits by repeating the sign bit of each number to ensure that the sign of the result will be valid for all possible addends. Bit 26 will always be the correct sign for the sum. The output of the 26-bit adder 44 consists of the sum of the two input numbers, an overflow signal OFLW2 which is generated if bit 25 is different from bit 26, and a New Sign signal (NSIGN2). The 25-bit output of the 26-bit adder 44 is coupled to a 24-bit multiplexer 45 such that the "A" input of the multiplexer 45 consists of bits 0 through 23 of the sum, and the "B" input of the multiplexer 45 consists of bits 1 through 24. If no overflow occurs, the "A" input of the 24-bit multiplexer 45 is outputted as the accumulated sum. If the overflow signal is active, that signal will select the "B" input of the multiplexer 44 to be outputted (the least significant bit is ignored).

The largest exponent value from the prior section, the New Sign signal NSIGN2 from the 26-bit adder 44, the overflow signal OFLW2, and the accumulated mantissa are all stored in the accumulator register 40 for the next pipeline stage. The overflow signal OFLW2 is also immediately fed back into the prior pipeline section (the exponent comparison and twos' complement section).

The clock to the accumulator register 40 is controlled through an AND gate 46 by the No Operation signal NOOP2, which when activated will prevent changes to the accumulator register 40.

The next section of the inventive circuit is the normalization section. The inputs to this section are the outputs of the accumulator register 40. The purpose of the normalization section is to convert the accumulated sum back into a floating point format.

Twenty-four of the twenty-five bits of the mantissa stored in the accumulator register 40 are coupled to a conditional ones' complementor 50 (the sign bit is not used). Additionally, all twenty-five bits of the mantissa (including the sign bit) are fed back to the prior accumulator section as an input to the first multiplexer 41 and the second multiplexer 42.

The New Sign signal NSIGN3 from the accumulator register 40 determines whether the mantissa in the conditional ones' complement circuit 50 passes through unchanged (in the case of a positive number) or if every bit of the mantissa is inverted to form the ones' complement representation (if the mantissa is negative). (Ideally, the twos' complement of the mantissa should be taken, but because of timing constraints in the present implementation technology, a ones' complement circuit has been used).

The output of the conditional ones' complement circuit 50 is coupled to a priority encoder 51 and to a left shifter 52. The left shifter 52 is activated by the priority encoder 51. The priority encoder 51 determines a shift code equal to the number of leading zeros in the output of the conditional ones' complement circuit 50. A special signal, ZERO3, is activated if all of the bits of the input to the priority encoder 52 are zero, signifying a result of zero. The shift code determined by the priority encoder 51 is coupled to the left shifter 52, which shifts the output of the ones' complement circuit 50 leftwards by the amount of the shift code. Zeros are shifted into the least significant bit positions. Thus, the output of the left shifter 52 will be the normalized form of the mantissa originally stored in the accumulator register 40. Since all of the leading zeros of the input to the left shifter 52 have been shifted out, the most significant bit of the output of the left shifter 52, which thus must be a "1", is treated as the implied "1" of the floating point number representation, and is discarded. However, a sign bit is merged in with the output of the left shifter 52 to form the final normalized mantissa for the accumulation sum. This sign bit is the New Sign signal NSIGN3 calculated in the accumulation section if the circuit is not in the Bypass mode, and otherwise is the input sign INSIGN3 of the original number input to the circuit if the Bypass mode is active. In this later case, in essence, the sign is the same as the original input sign passed through all of the register delays of the circuit. Which of the two signs is selected is determined by the Bypass signal, which controls the action of a 1-bit multiplexer 53 whose two inputs are the New Sign signal generated in the accumulation section and the original input sign.

The shift code generated by the priority encoder 51 is also used to calculate the output exponent. First, the largest exponent, LGEXP3, stored in the accumulator register 40, is coupled to an adder circuit 54 and added to the overflow signal, OFLW3. If the overflow signal is active, this effectively increases the largest exponent by one. Next, the output of the adder 54 is coupled to an input of a subtractor circuit 55 which subtracts from the new largest exponent number the shift code generated by the priority encoder 51, thus adjusting the exponent to account for the shift in the binary point of the mantissa after normalization. The output of the subtractor 55 is then merged with the output of the left shifter 52 and the 1-bit multiplexer 53 to form the complete floating point number accumulated by the circuit. This complete number is coupled to the input of a 32-bit multiplexer 56. The other input to the multiplexer consists of predetermined signals representing the limits of the system. A "clamping" signal is generated to select the output of the 32-bit multiplexer 56 as either the accumulated floating point number, or a representation of plus or minus infinity, or zero. The clamping signal, generated by an OR gate 59, is active if the ZERO3 signal from the priority encoder 51 is active, or if the calculated exponent is greater than the highest permissible exponent, or if the exponent is negative, or if the exponent bits are either all zeros or all ones, while the circuit is not in the Bypass mode.

In all cases, the mantissa to the "B" input of the 32-bit multiplexer 56 is always set to zero. The exponent of the clamping value is zero if the exponent of the accumulated number is negative, if the ZERO3 signal from the priority encoder 51 is active, or if the exponent bits are all zeros. In all other cases of clamping, the exponent bits for the clamping value are set at ones. The sign of the clamping value is zero if the exponent bits are all zero, otherwise the sign is equal to the value of the New Sign signal NSIGN3 from the accumulator register 40.

The output of the 32-bit multiplexer 56 is coupled to an output register 60, which comprises the output for the entire circuit. The clock to the output register 60 is controlled through an AND gate 61 by the No Operation signal NOOP3 and the HoldOut signal. If either signal is activated, the input to the output register 60 is disabled and the output of the entire circuit remains unchanged.

While this invention had been described with reference to a preferred embodiment, it is not intended that this description be construed in a limiting sense. Various modifications of the preferred embodiment as well as other embodiments of the invention, will be apparent to persons skilled in the art upon reference to this description. For example, the basic inventive circuit could be readily adapted to a non-pipelined architecture. It is therefore contemplated that the appended claims will cover any modifications or embodiments as fall within the true scope of the invention.

We claim:

1. A pipelined architecture, floating point number accumulator circuit for totalling a multiplicity of floating point numbers, such numbers comprising a sign, an exponent, and a mantissa, the circuit including:
   a. an input circuit for receiving and temporarily storing an input floating point number;
   b. an intermediate register for temporarily storing data;
   c. an exponent comparison circuit, coupled to the output of the input circuit and of the intermediate register, for determining a shift code as a function of the difference between the values of the exponent of the input number and the exponent of a numeric result previously stored in the intermediate register, and for temporarily storing the larger exponent and the shift code in the intermediate register;
   d. an accumulator register for temporarily accumulating non-normalized numeric results;

e. an accumulation circuit, coupled to the output of the exponent comparison circuit and of the accumulator register, for shifting the mantissa of the smaller of the input number and a non-normalized numeric result, previously accumulated in the accumulator register, by the amount of the shift code to align the binary points of both numbers, and for summing the two aligned numbers as a non-normalized numeric result and accumulating the non-normalized numeric result in the accumulator register;

f. a normalization circuit, coupled to the accumulator register, for converting the non-normalized numeric result of the accumulation circuit into normalized floating point number form; and g. an output circuit, coupled to the output of the normalization circuit, for temporarily storing the normalized result in an output register and for outputting the normalized result from the circuit.

2. The floating point accumulator circuit of claim 1, further including a conditional twos' complement circuit, coupled to the output of the input circuit, for calculating the twos' complement of the mantissa of the input number if the input number is negative.

3. The floating point accumulator circuit of claim 2, wherein the normalization circuit includes means for converting the non-normalized numeric result of the accumulator register into normalized form comprising:
   a. a conditional complement circuit for calculating the complement of the mantissa of the numeric result if the result is negative;
   b. circuit means for shifting the mantissa of the result until all leading zero bits are removed; and
   c. exponent adjustment means for adjusting the exponent of the numeric result by the amount of the zero-removal shift.

4. The floating point accumulator circuit of claim 1, wherein the normalization circuit includes means for converting the non-normalized numeric result into normalized form comprising:
   a. circuit means for shifting the mantissa of the result until all leading zero bits are removed; and
   b. exponent adjustment means for adjusting the exponent of the numeric result by the amount of the zero-removal shift.

5. The floating point accumulator circuit of claim 1, wherein the input circuit further includes circuit means for receiving portions of the input number in a time-multiplexed sequence.

6. The floating point accumulator circuit of claim 1, wherein the exponent comparison circuit further includes circuit means for adjusting the shift code if the sum from the accumulation circuit overflows.

7. A pipelined architecture, floating point number accumulator circuit for totalling a multiplicity of floating point numbers, such numbers comprising a sign, an exponent, and a mantissa, the circuit including:
   a. an input circuit for receiving and temporarily storing an input floating point number;
   b. an intermediate register for temporarily storing data;
   c. an exponent comparison and twos' complement circuit, coupled to the output of the input circuit and of the intermediate register, for determining a shift code as a function of the difference between the values of the exponent of the input number and the exponent of a numeric result previously stored in the intermediate register, for transforming the mantissa of the input number into the twos' complement of the input mantissa if the input number is negative, and for temporarily storing the mantissa, the larger exponent and the shift code in the intermediate register;
   d. an accumulator register for temporarily accumulating non-normalized numeric results;
   e. an accumulation circuit, coupled to the output of the exponent comparison circuit and of the accumulator register, for shifting the mantissa of the smaller of the input number and a non-normalized numeric result, previously accumulated in the accumulator register, by the amount of the shift code to align the binary points of both numbers, and for summing the two aligned numbers as a non-normalized numeric result and accumulating the non-normalized numeric result in the accumulator register;
   f. a normalization circuit, coupled to the accumulator register, for converting the non-normalized numeric result of the accumulation circuit into normalized floating point number form, comprising a conditional complement circuit for calculating the complement of the mantissa of the non-normalized numeric result if the result is negative, circuit means for shifting the mantissa of the non-normalized numeric result until all leading zero bits are removed, and exponent adjustment means for adjusting the exponent of the non-normalized numeric result by the amount of the zero-removal shift; and
   g. an output circuit, coupled to the output of the normalization circuit, for temporarily storing the normalized result in an output register and for outputting the normalized result from the circuit.

8. The floating point accumulator circuit of claim 7, wherein the input circuit further includes circuit means for receiving portions of the input number in a time-multiplexed sequence.

9. The floating point accumulator circuit of claim 7, wherein the exponent comparison circuit further includes circuit means for adjusting the shift code if the sum from the accumulation circuit overflows.

10. A floating point number accumulator circuit for totalling a multiplicity of floating point numbers, such numbers comprising a sign, and exponent, and a mantissa, the circuit including:
   a. an input circuit for receiving an input floating point number;
   b. an exponent comparison circuit, coupled to the output of the input circuit and to an accumulation circuit, for determining a shift code as a function of the larger of the exponent of the input number and the exponent of a numeric result previously accumulated in the accumulation circuit;
   c. wherein the accumulation circuit is coupled to the output of the exponent comparison circuit and includes an accumulator register, the accumulation circuit further including means for shifting the mantissa of the smaller of the input number and a non-normalized numeric result, previously accumulated in the accumulator register, by the amount of the shift code to align the binary points of both numbers, and for summing the two aligned numbers as a non-normalized numeric result and accumulating the non-normalized numeric result in the accumulator register;
   d. a normalization circuit, coupled to the accumulator register, for converting the non-normalized numeric result of the accumulation register into normalized floating point number form; and
   e. an output circuit, coupled to the output of the normalization circuit, for outputting the normalized result from the circuit.

* * * * *